United States Patent [19]

Goto et al.

[11] Patent Number: 5,386,760
[45] Date of Patent: Feb. 7, 1995

[54] BRAKE BOOSTER WITH REACTION DISK RETAINER

[75] Inventors: Hiroya Goto; Tohru Satoh, both of Saitama, Japan

[73] Assignee: Jidosha Kiki Co., Ltd., Tokyo, Japan

[21] Appl. No.: 160,953

[22] Filed: Dec. 1, 1993

[30] Foreign Application Priority Data

Dec. 11, 1992 [JP] Japan .................. 4-353413

[51] Int. Cl.6 .............. F15B 9/10; F16J 1/10
[52] U.S. Cl. ................. 91/369.2; 92/84; 91/376 R
[58] Field of Search ........... 91/369.2, 369.3, 376 R; 92/84; 60/554

[56] References Cited

U.S. PATENT DOCUMENTS

| | | | |
|---|---|---|---|
| 4,491,056 | 1/1985 | Tsubouchi | 91/369.2 |
| 4,587,884 | 5/1986 | Tsubouchi | 91/369.2 |
| 4,747,336 | 5/1988 | Uyama . | |
| 4,757,748 | 7/1988 | Kawasumi et al. | 91/369.2 |
| 4,787,292 | 11/1988 | Tsuyuki et al. | 91/369.3 |
| 4,862,787 | 9/1989 | Suzuki et al. | 91/369.2 |
| 4,882,980 | 11/1989 | Arino et al. . | |
| 5,027,692 | 7/1991 | Satoh et al. | 91/376 R |
| 5,027,695 | 7/1991 | Inoue et al. | 91/369.2 |
| 5,029,515 | 7/1991 | Endo | 91/369.3 X |
| 5,046,398 | 9/1991 | Hamamiya et al. | 91/369.2 |
| 5,076,141 | 12/1991 | Konishi . | |
| 5,121,673 | 6/1992 | Araki | 91/369.1 |
| 5,228,377 | 7/1993 | Watanabe . | |
| 5,263,398 | 11/1993 | Kobayashi et al. | 91/369.2 |
| 5,333,534 | 8/1994 | Uyama | 91/376 R |
| 5,337,650 | 8/1994 | Uyama | 91/376 R |

*Primary Examiner*—Edward K. Look
*Assistant Examiner*—John Ryznic
*Attorney, Agent, or Firm*—Flynn, Thiel, Boutell & Tanis

[57] ABSTRACT

An improvement of a recess formed in one end of an output shaft of a brake booster is disclosed. At its one end, the rear extremity of the output shaft is formed with a flange-like stop, which is formed of an annular sheet material. The engagement of the stop with the retainer is effective to prevent said one end of the output shaft from being disengaged from an annular projection on a valve body. This allows the diameter of a reaction disc to be increased without requiring an increase in the diameter of the valve body. Accordingly, a brake feeling can be adjusted over an increased extent than before by increasing the diameter of the reaction disc.

8 Claims, 4 Drawing Sheets

BRAKE BOOSTER WITH REACTION DISK RETAINER

FIELD OF THE INVENTION

The invention relates to a brake booster, and more particularly, to an improvement of a recess formed in one end of an output shaft thereof.

DESCRIPTION OF THE PRIOR ART

A brake booster is known in the art which comprises a valve body slidably disposed within a shell, an annular projection formed on the valve body, an output shaft having a recess formed in one end thereof in which a reaction disc is received and which is slidably fitted over the annular projection on the valve body, and a return spring disposed between the shell and the valve body for returning the valve body to its inoperative position.

A cup-shaped retainer is used in such brake booster of the prior art. (See, for example, U.S. Pat. No. 5,228,377.) The cup-shaped retainer is fitted over said one end of the output shaft from the front side thereof while the rear end of the retainer is disposed in abutment against the end face of the valve body, with the rear end of the return spring bearing against the rear end of the retainer. In this way, the cup-shaped retainer is held in abutment against the end face of the valve body, thereby preventing said one end of the output shaft from being disengaged from the annular projection by means of the retainer so mounted.

In a conventional brake booster of the kind described above, if it is desired to increase the diameter of the reaction disc in order to adjust a brake feeling experienced by a driver by changing a servo ratio, for example, the following difficulty is experienced: Specifically, in the prior art arrangement as mentioned above, the retainer is cup-shaped and includes a tubular portion which covers said one end of the output shaft while such tubular portion is radially located between the return spring and said one end of the output shaft. Accordingly, when the diameter of the reaction disc is increased in order to change the servo ratio, it necessarily follows that the diameter of the output shaft must be increased at said one end, accompanying the requirement that the diameters of both the retainer and the return spring must be increased. This also requires that the diameter of the valve body itself be increased, resulting in a disadvantage that the effective diameter of the shell which contains the valve body is reduced.

SUMMARY OF THE INVENTION

The invention relates to a brake booster comprising a valve body slidably disposed within a shell, an annular projection formed on the valve body, an output shaft having a recess formed in its one end in which a reaction disc is received and which is slidably fitted over the annular projection on the valve body, and a return spring disposed between the shell and the valve body for returning the valve body to its inoperative position. In view of the disadvantage mentioned above, in accordance with the invention, the retainer is formed into an annular configuration and is interposed and held between one end of the return spring and the end face of the valve body, while the outer periphery of the recess formed in one end of the output shaft is formed with a stop which projects radially outward. The stop is engaged with the retainer in order to prevent the recess from being disengaged from the annular projection on the valve body.

In accordance with another feature of the invention, in the basic arrangement of the brake booster mentioned above, the outer periphery of the recess formed in one end of the output shaft is formed with a stop which projects radially outward and which is engaged with one end of a return spring having its other end disposed in abutment against the valve body, thereby preventing the recess from being disengaged from the annular projection on the valve body.

With this arrangement, the stop is effective to prevent the recess from being disengaged from the annular projection on the valve body, thereby eliminating the need for a tubular portion of the retainer as used in the prior art or the retainer itself.

As a consequence, if the diameter of the reaction disc is increased in an attempt to change the brake feeling, the diameter of the output shaft at one end thereof can be increased by an amount corresponding to a radial clearance between the return spring and the one end of the output shaft, which is created by eliminating the tubular portion of the conventional retainer or the retainer itself, avoiding the need to increase the diameter of the valve body despite the diameter of the output shaft is increased at its one end. In other words, there is no need to increase the diameter of the valve body, despite the fact that the diameter of the reaction disc as well as the diameter of the output shaft at its one end can be increased by an amount created by the elimination of the tubular portion of the retainer or the retainer itself. In this manner, the diameter of the reaction disc can be increased without accompanying an increase in the diameter of the valve body, thus allowing the flexibility or extent of adjusting the brake feeling to be enhanced. Above and other objects, features and advantages of the invention will become apparent from the following description of several embodiments thereof with reference to the attached drawings.

DETAILED DESCRIPTION OF EMBODIMENTS

Figure 1:
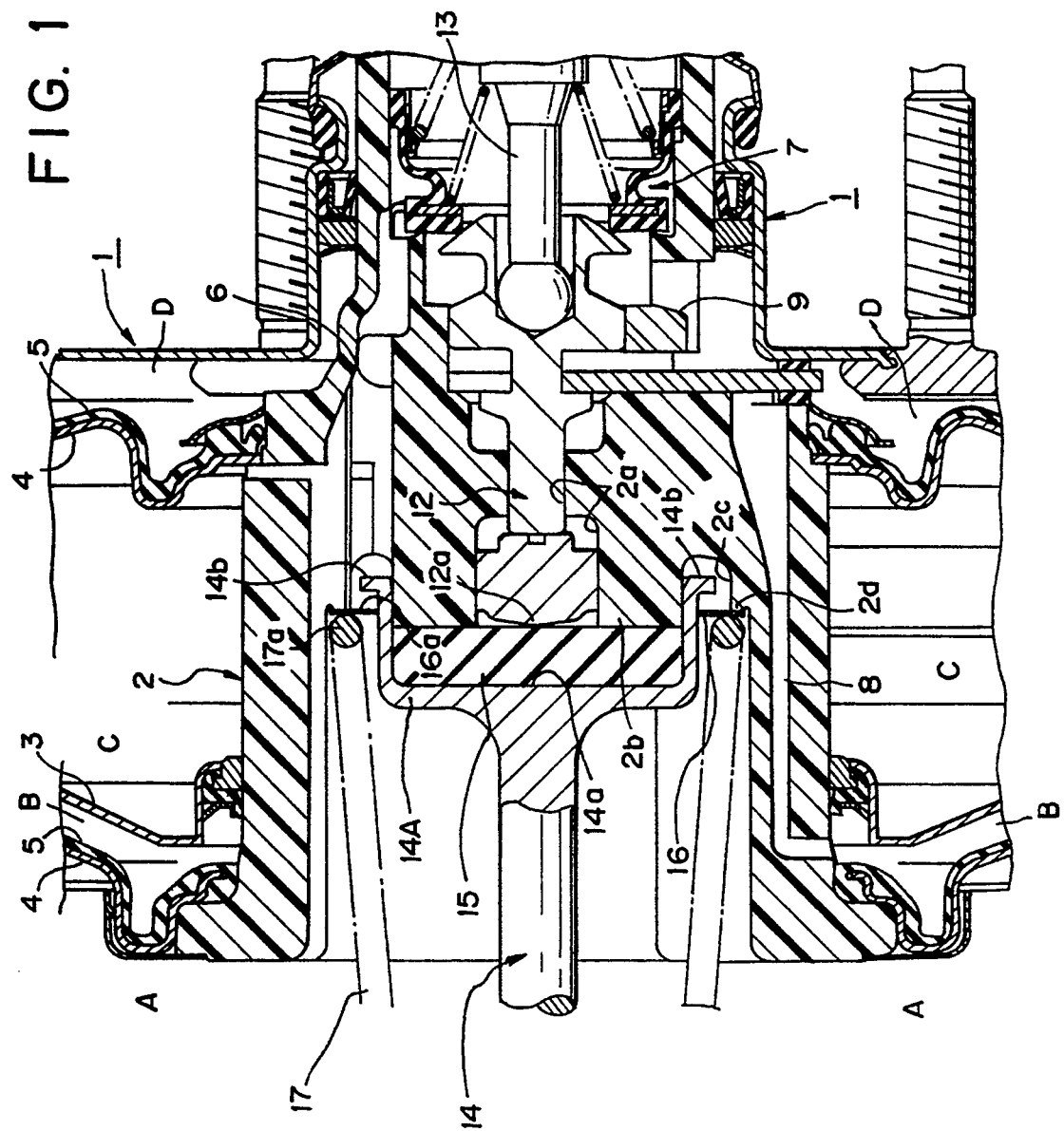
FIG. 1 is a cross section of a first embodiment of the invention.

Referring to the drawings, FIG. 1 shows an essential part of a brake booster of tandem type. Specifically, slidably disposed within a shell is a substantially tubular valve body 2 which is formed of synthetic resin. The interior of the shell is divided into a pair of front and rear chambers by means of a center plate 3 including an axial portion through which the valve body 2 slidably extends.

A power piston 4 is connected around the outer periphery of the valve body at each of locations thereof disposed within the chambers divided by the center plate 3, and a diaphragm 5 is applied to the back surface of each power piston 4, thus defining constant pressure chambers A, C and variable pressure chambers B, D across the power pistons 4.

A negative pressure is normally supplied to the constant pressure chamber A through a tubing, not shown, which is provided in order to introduce a negative pressure. The constant pressure chamber A communicates with the constant pressure chamber C through a constant pressure passage 6 formed in the valve body 2, and thus the negative pressure is normally introduced into the both constant pressure chambers A, C. A valve mechanism 7, which is constructed in known manner, and contained within the valve body 2, allows or blocks a communication of the rear end of the constant pressure passage 6 with the both variable pressure chambers B, D. The both variable pressure chambers B, D communicate with each other through a variable pressure passage 8 formed in the valve body 2, and can also communicate with the both constant pressure chambers A, C or the atmosphere through a radial passage 9 formed in the valve body 2 and through the valve mechanism 7.

A valve plunger 12 forms part of the valve mechanism 7, and is slidably fitted into a stepped through-opening 2a formed in the axial portion of the valve body 2. The rear end of the valve plunger 12 is connected to an input shaft 13 which is mechanically coupled to a brake pedal, not shown.

The valve body 2 is formed with a forwardly projecting annular projection 2b in surrounding relationship with the front end of the through-opening 2a, and is also formed with an annular groove 2c which is located radially outward of and in adjacent continuity to the annular projection 2b. A step 2d is also formed on the valve body forwardly adjacent to and radially outward of the annular groove 2c in continuing relationship therewith.

An output shaft 14 has one end or base end 14A in which a recess 14a is formed for containing a reaction disc 15 therein. A tubular section of the output shaft which defines the recess 14a is slidably fitted over the annular projection 2b on the valve body 2, thus holding the reaction disc 15 sandwiched between the bottom of the recess 14a and the front end face of the annular projection 2b. In this manner, the rear end face of the reaction disc 15 is disposed in opposing relationship with the front end face of the valve plunger 12 in the axial portion of the disc 15. When the input shaft 13 is driven forward to operate the valve mechanism 7 to actuate the brake booster by introducing the atmosphere into the both variable pressure chambers B, D, a reaction from the output shaft 14 to which the output is applied is transmitted from the reaction disc 15 through the valve plunger 12 to the input shaft 13, thus allowing the driver to experience a brake reaction.

A retainer 16 which is fitted around the end 14A of the output shaft 14 is disposed in abutment against the end face of the step 2d on the valve body 2. A return spring 17 has its rear end 17a disposed in abutment against the retainer 16 so disposed, from the front side. In this manner, the retainer 16 is held in abutment against the end face of the step 2d, and is effective to prevent the recess 14a of the output shaft 14 from being disengaged from the annular projection 2b on the valve body 2.

The front end, not shown, of the return spring 17 is disposed in abutment against the internal wall of the shell 1, whereby in the inoperative condition of the brake booster, the valve body 2 is positioned in its inoperative position shown by the resilience of the return spring 17. Under such inoperative condition of the brake booster, a slight clearance is maintained between the rear end face of the reaction disc 15 and the front end face 12a of the valve plunger 12.

In the present embodiment, a flange-like stop 14b which projects radially outward and which continues circumferentially is formed around the outer periphery of the rear end of the recess 14a or the extremity of the end 14A of the output shaft 14.

The retainer 16 is formed of an annular sheet member, and is interposed and held between the rear end 17a of the return spring 17 and the end face of the step 2d on the valve body 2.

The stop 14b has an outer diameter which is greater than the inner diameter of the retainer 16. Accordingly, if the end 14A of the output shaft 14 is displaced forwardly relatively to the annular projection 2b and tends to be disengaged from the annular projection 2b, the engagement of the stop 14b with the inner periphery of the retainer 16 prevents such disengagement.

Figure 4:
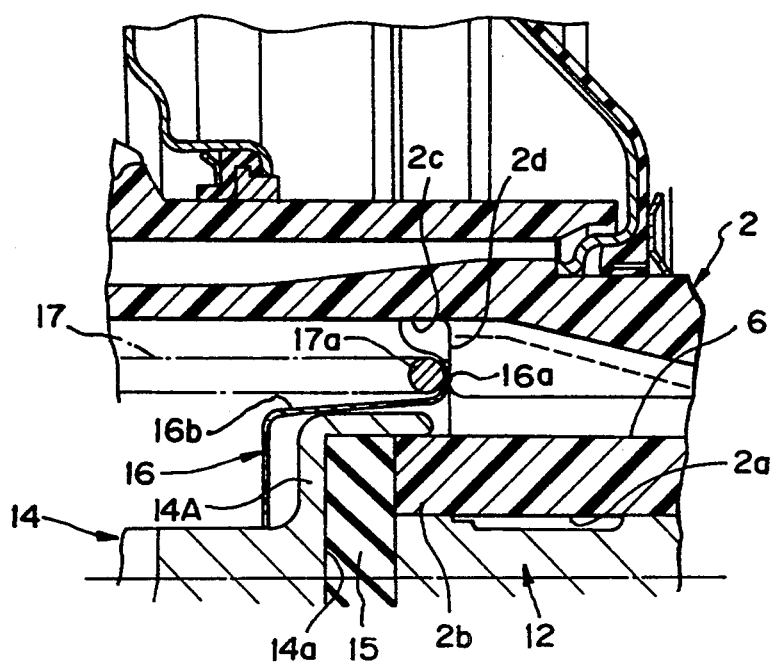
FIG. 4 is a cross section illustrating the prior art.

By contrast, in a conventional arrangement as shown in FIG. 4, the retainer 16 is cup-shaped, and the end 14A of the output shaft 14 is not provided with an arrangement which is functionally equivalent to the stop shown in the embodiment of the invention.

Thus, the cup-shaped retainer 16 of the prior art is fitted over the end 14A of the output shaft 14, and the rear end 16a of the retainer 16 is disposed in abutment against the end face of the step 2d on the valve body 2, with the rear end 17a of the return spring 17 being disposed in abutment against the rear end 16a of the retainer 16. This arrangement is effective to prevent the disengagement of the end 14A of the output shaft 14 from the annular projection. However, as a consequence of such construction, a tubular portion 16b of the retainer 16 must be located between the return spring 17 and the end 14A of the output shaft 14.

In the conventional arrangement thus constructed, if it is desired to increase the diameter of the reaction disc 15 in order to change the servo ratio to thereby adjust the brake feeling experienced by the driver, for example, it is necessarily required that the diameter of the end 14A of the output shaft 14 be increased, with concomitant increase in the diameters of the tubular portion 16b of the retainer 16 and the return spring 17 as well as the valve body 2. When the diameter of the valve body 2 is increased in this manner, there follows a disadvantage that the effective diameter of the shell 1 which contains the valve body 2 is reduced.

In comparison to the conventional arrangement mentioned above, the construction according to the present embodiment allows the diameter of the reaction disc 15 to be increased for the purpose of adjusting a brake feeling experienced by the driver by allowing the diameter of the end 14A of the output shaft 14 increased by an amount created by the elimination of the tubular portion 16b. In addition, if the diameter of the end 14A of the output shaft 14 is increased, there is no need to increase the diameters of the return spring 17 and the valve body 2. Accordingly, as compared with the prior art illustrated in FIG. 4, the brake feeling can be adjusted over an increased extent by increasing the diameter of the reaction disc 15.

Second Embodiment

Figure 2:
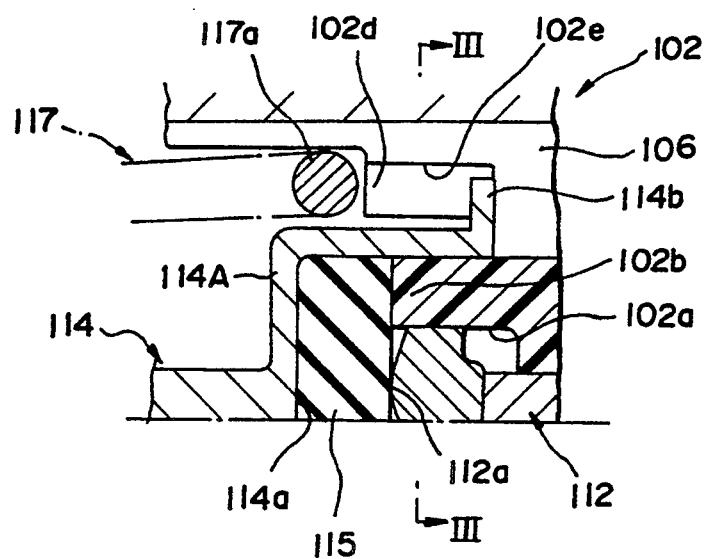
FIG. 2 is a cross section of another embodiment of the invention.

FIG. 2 shows a second embodiment of the invention. In the second embodiment, the retainer 16 shown in the first embodiment is omitted, while the rear end 117a of a return spring 117 is disposed in direct abutment against the end face of a step 102d on a valve body 102.

Figure 3:
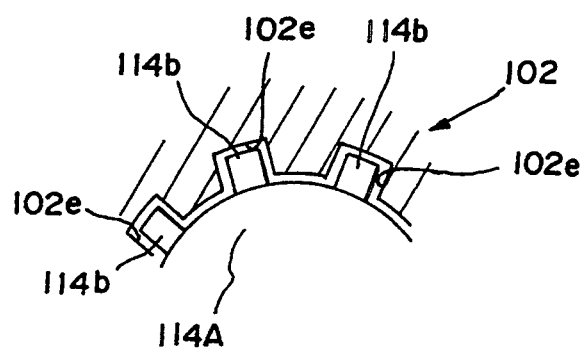
FIG. 3 is a cross section taken along the line III—III shown in FIG. 2.

As shown in FIG. 3, in the second embodiment, an output shaft 114 has stops 114b in the form of a plurality of projections extending radially outward from the end 114A of the output shaft 114 at an equal circumferential spacing. A plurality of axially extending grooves 102e are formed through the valve body 2 so as to extend rearwardly from the end face of the step 102d, in conformity to the configuration of the projections which define the stops 114b. Each of the plurality of projections or stops 114b is slidably fitted in the axial groove 102e. A return spring 117 has its rear end 117a disposed in abutment against the end face of the step 102d at the opening of the axial groove 102e in which the stop 114b is fitted. The stop 114b has an outer diameter which is greater than the inner diameter of the rear end 117a of the return spring 117, so that if the end 114A of the output shaft 114 tends to be disengaged from the annular projection 102b, the engagement of the stop 114b with the rear end 117a of the return spring 117 prevents such disengagement.

The second embodiment achieves the similar functioning and effect as those achieved by the first embodiment. It is to be noted that parts appearing in the second embodiment are designated by like numerals as used for corresponding elements shown in the first embodiment, to which 100 is added.

Figure 5:
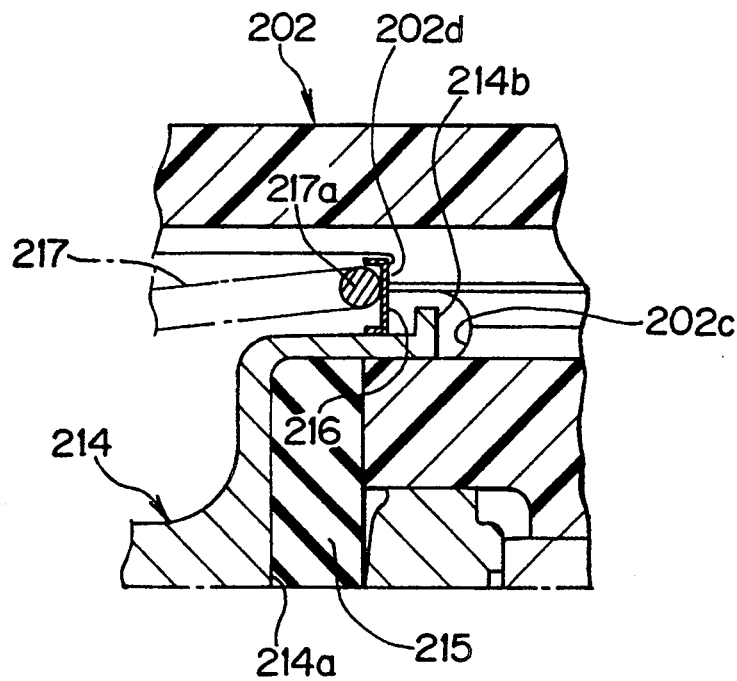
FIGS. 5 and 6 are cross sections of other embodiments of the invention.
Figure 6:
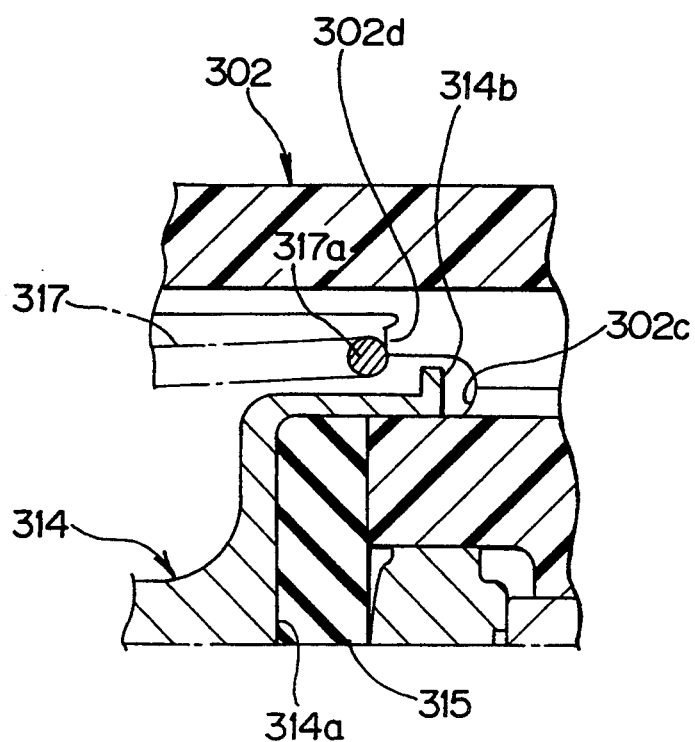

While the retainer 16 used in the first embodiment is formed of an annular sheet material, the retainer shown in the first embodiment may be formed with an axially extending, short sleeve around its inner or outer periphery, as illustrated in FIG. 5.

In addition, the retainer 16 of the first embodiment may be omitted, and the rear end 317a of a return spring 317 may be disposed in abutment against the end face of a step 302d, with the rear end 317a being engaged by a flange-like stop 314b to thereby prevent the disengagement of the end 314A of an output shaft 314. Again, such arrangement is effective to achieve the similar functioning and effect as those achieved by the preceding embodiments.

While the invention has been disclosed above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A brake booster comprising a valve body slidably disposed within a shell, an annular projection formed on the valve body, an output shaft having a recess formed in its one end in which a reaction disc is received and which is slidably fitted over the annular projection on the valve body, and a return spring disposed between the shell and the valve body for returning the valve body to its inoperative position;

characterized in that a retainer which is formed into an annular configuration is interposed and held between one end of the return spring and an end face of the valve body, while the outer periphery of the recess formed in one end of the output shaft is formed with a stop which projects radially outward, with the stop being engaged with the retainer to thereby prevent the recess from being disengaged from the annular projection on the valve body.

2. A brake booster according to claim 1 in which the valve body also includes an annular groove formed adjacent to and radially outward of the annular projection and a step adjacent to and radially outward of the annular groove, the stop being slidably fitted into the annular groove, the end face of the valve body being defined by the end face of the step.

3. A brake booster according to claim 2 in which the retainer is formed of a sheet material, and the stop is formed as a circumferentially continuous flange, the retainer having an inner diameter which is smaller than the outer diameter of the stop.

4. A brake booster according to claim 3 in which the retainer formed of a sheet material is provided with a sleeve of a reduced axial length around either inner or outer peripheral edge thereof.

5. A brake booster comprising a valve body slidably disposed within a shell, an annular projection formed on the valve body, an output shaft having a recess formed in its one end in which a reaction disc is received and which is slidably fitted over the annular projection on the valve body, and a return spring disposed between the shell and the valve body for returning the valve body to its inoperative position;

characterized in that the outer periphery of the recess formed in one end of the output shaft is formed with a stop which projects radially outward, the stop being engaged with one end of the return spring which is disposed in abutment against the valve body, thereby preventing the disengagement of the recess from the annular projection on the valve body.

6. A brake booster according to claim 5 in which the valve body includes an annular groove formed adjacent to and radially outward of the annular projection and a step formed adjacent to and radially outward of the annular groove, the stop being fitted into the annular groove, one end of the return spring being disposed in abutment against the end face of the stop, the stop having an outer diameter which is greater than the inner diameter of one end of the return spring.

7. A brake booster according to claim 6 in which the stop comprises a circumferentially continuous flange.

8. A brake booster according to claim 6 in which the stop comprises a plurality of projections which are circumferentially spaced apart, the peripheral surfaces of the step and the annular groove which define a boundary therebetween are formed with a plurality of axial grooves in which the plurality of projections are fitted.

* * * * *